United States Patent
Loboz et al.

(10) Patent No.: US 7,031,879 B1
(45) Date of Patent: Apr. 18, 2006

(54) SYSTEM AND METHOD FOR DETERMINING DEPENDENCIES BETWEEN SYSTEM RESOURCE PERFORMANCE CHARACTERISTICS

(75) Inventors: Charles Zdzislaw Loboz, West Ryde (AU); Jonatan Kelu, Granville (AU)

(73) Assignee: Unisys Corporation, Blue Bell, PA (US)

( * ) Notice: Subject to any disclaimer, the term of this patent is extended or adjusted under 35 U.S.C. 154(b) by 87 days.

(21) Appl. No.: 10/775,844

(22) Filed: Feb. 10, 2004

(51) Int. Cl.
*G06F 15/16* (2006.01)

(52) U.S. Cl. ..................................... 702/182

(58) Field of Classification Search .................. 702/182, 702/25; 705/8, 9, 412; 707/10; 455/424; 700/104; 376/217; 709/203; 382/128, 132; 434/236

See application file for complete search history.

(56) References Cited

U.S. PATENT DOCUMENTS

| | | | | |
|---|---|---|---|---|
| 5,826,236 A | * | 10/1998 | Narimatsu et al. | 705/8 |
| 6,212,520 B1 | * | 4/2001 | Maruyama et al. | 707/10 |
| 6,694,350 B1 | * | 2/2004 | Kurashima et al. | 709/203 |
| 2003/0096606 A1 | * | 5/2003 | Inman et al. | 455/424 |

* cited by examiner

*Primary Examiner*—Michael Nghiem
*Assistant Examiner*—Tung Lau
(74) *Attorney, Agent, or Firm*—Mark T. Starr; Alfred W. Kozak

(57) ABSTRACT

The present invention provides a system and method for analyzing a computing system. The method comprises the step of determining a dependency between a first and second system resource performance characteristic in a computing system. The step of determining the dependency includes the steps of providing data values for the first performance characteristic and the second performance characteristic of the computing system, and applying a mathematical algorithm to derive a correlation value between the first and second characteristics. The correlation value provides an indication of the relative association between the second characteristic and the first characteristic.

3 Claims, 1 Drawing Sheet

Figure 1:
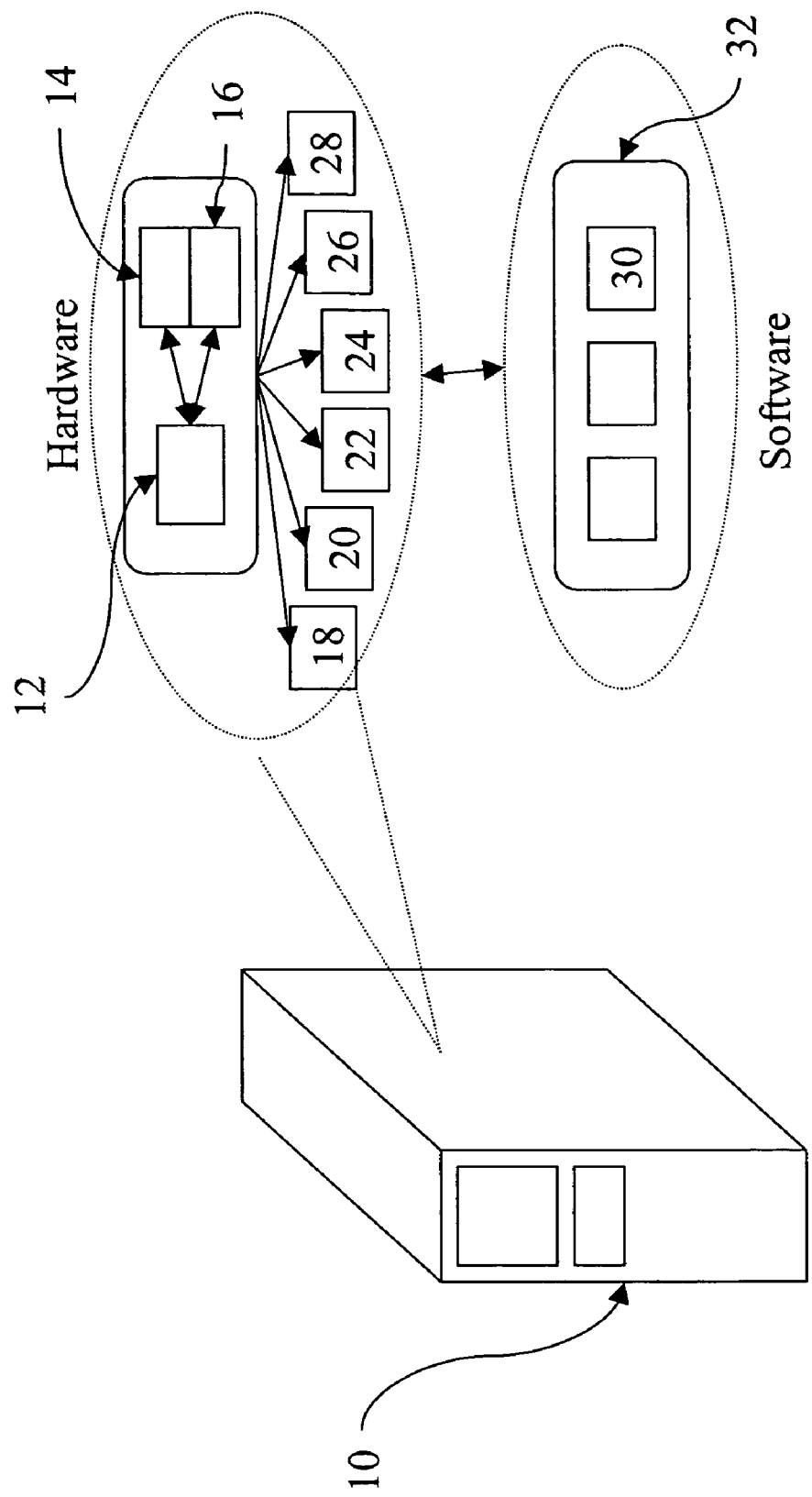

SYSTEM AND METHOD FOR DETERMINING DEPENDENCIES BETWEEN SYSTEM RESOURCE PERFORMANCE CHARACTERISTICS

FIELD OF THE INVENTION

The present invention relates to a system and method for determining dependencies between system resource performance characteristics in a computing system.

BACKGROUND OF THE INVENTION

Transaction processing systems, such as enterprise class computer systems and e-commerce servers, require monitoring and analysis in order to ensure efficient utilisation of hardware resources. That is, it is desirable to maximise the number of transactions processed by a computing system within a given time.

Generally, in monitoring and analysing the hardware and software resource usage of a computing system, a system monitor will generally observe and record characteristics of the transaction load and other characteristics of system behaviour. The data gathered by the monitor is used by users (such as system administrators) to identify problem areas and reduce performance bottlenecks.

For example, a system administrator will generally attempt to balance system load flow between system elements, by, for example, switching off less essential services to provide more resources to critical services.

In order to make an informed decision on how to balance load or change the operating parameters of a computing system, a system administrator will generally be provided with a large number of characteristics that are monitored by the computing system. These characteristics are generally monitored by "counters", which are generally software modules which collect statistics on the performance of various hardware and software sub-systems within a computing system.

A typical server will have over a thousand counters, each counter describing a different aspect of system behaviour. The counters may include characteristics such as processor (CPU) utilisation, interrupt rate, memory usage, number of disk reads within a given time, and number of disk writes within a given time.

In the art, the abovementioned counters are commonly split into two general "types".

The first type of counter is utilised for system monitoring. These counters are generally associated with on-line display of counter values. The Windows™ operating system performance monitor "perfmon" and the "sar" software package on Unix™ operating system are examples of software packages that monitor the first type of counters.

The second counter type is generally employed for system analysis. That is, these counters are generally employed off-line, for analysis of daily and weekly patterns of load, response time, and gauging the effect of hardware and/or software upgrades.

Whilst these two types of counters utilise different methodologies, they attempt to achieve the same aim, namely to provide an indicator of how computer resources are utilised within a computing system.

Existing tools provide no mechanism to organise the large number of counters ("characteristics") present in contemporary computer systems. Existing tools are capable of displaying any required characteristic, but do not offer any guidance to the system administrator as to which characteristics are important. That is, the system administrator has to specify which characteristics they wish to monitor and/or analyse.

Traditionally, characteristics selected for monitoring/analysis are chosen on the basis of whether they are "thought" to be important. For example, it is generally held by persons skilled in the art that the daily average CPU utilisation and the daily average throughput are important characteristics that should be monitored closely.

By employing such a methodology, hundreds or potentially thousands of other characteristics are ignored, primarily because it is too time consuming to monitor or analyse every system characteristic. In order to ameliorate this problem, some contemporary monitoring tools allow the user to set an alarm for a particular counter. The alarm will alert the system administrator when the value of the counter passes a predetermined value. This approach provides some indication of which characteristics should be displayed and/or analysed, but still requires system administrators to manually configure the alarm levels. As there are potentially thousands of separate counters, many system administrators will not set alarm levels for each characteristic. Therefore, this system of providing alarm levels does not satisfactorily solve the problem.

In addition, some contemporary monitoring tools allow for two selected characteristics to be plotted against each other. Once again, the system administrator is required to select which characteristics they wish to view. Thus, this feature does not ameliorate the problem of determing which characteristics are important to a computing system.

Similarly, it is difficult for the producers of monitoring tools to predict and pre-select system characteristics which will be of particular importance on a defined computing system. For some computing systems, the important characteristic may be processor time, for some it may be disk access time.

In addition, different computing systems will have different daily usage profiles and application mixes, so each computing system will require individual customisation. However, during the installation and customisation phase, it is easy to accidentally omit characteristics which are important for a given installation. For example, the number of context switches per second, a counter which is rarely examined, may be important for a particular computing system.

In other words, the problem of determining which characteristics are important to a particular computing system is circular. The user is required to know which counters should be included to adequately analyse the system, yet to analyse the system, the correct counters must be specified to ensure adequate data collection.

Moreover, despite careful initial analysis, the dynamic nature of system load frequently results in a situation where new characteristics become important only during certain periods of time.

There is a need to provide a system or method which assists the system administrator in determining which system performance characteristics are important for a given computing system.

SUMMARY OF THE INVENTION

In a first aspect, the present invention provides a method for analysing a computing system comprising the step of determining a dependency between a first and a second system resource performance characteristic in a computing system, the step of determining the dependency including the steps of:

providing data values for the first performance characteristic and the second performance characteristic of the computing system; and applying a mathematical algorithm to derive a correlation value between the first and second characteristics, wherein the correlation value provides an indication of the relative association between the second characteristic and the first characteristic.

The present invention advantageously allows an operator or system administrator to determine which characteristics of a computing system are important.

Preferably, the mathematical algorithm is the Pearson correlation coefficient equation.

In a second aspect, the present invention provides a method of determining sub-optimal performance in a computing system, comprising the steps of, determining a dependency between a first and a second system resource performance characteristic in a computing system, the step of determining the dependency including the steps of:

providing data values for the first performance characteristic and the second performance characteristic of the computing system; and applying a mathematical algorithm to derive a correlation value between the first and second characteristics, wherein the correlation value provides an indication of the relative association between the second characteristic and the first characteristic.

In a third aspect, the present invention provides a system for analysing a computing system comprising determination means arranged to determine a dependency between a first and a second system resource performance characteristic in a computing system, the determination means further comprising:

data gathering means arranged to provide data values for the first performance characteristic and the second performance characteristic of the computing system; and computational means arranged to apply a mathematical algorithm to derive a correlation value between the first and second characteristics, wherein the correlation value provides an indication of the relative association between the second characteristic and the first characteristic.

In a fourth aspect, the present invention provides a computer program arranged, when loaded on a computing system, to implement the method of a first aspect of the invention.

In a fifth aspect, the present invention provides a computer readable medium providing a computer program in accordance with a fourth aspect of the invention.

In a sixth aspect, the present invention provides a method of analysing a computer system to determine the cause of an intermittent system overload, comprising the steps of, providing data values for the first performance characteristic and the second performance characteristic of the computing system, and applying a mathematical algorithm to derive a correlation value between the first and second characteristics, wherein the correlation value provides and indication of the relative association between the second characteristic and the first characteristic.

In a seventh aspect, the present invention provides a method of ameliorating the need to monitor multiple system characteristics by determining a subset of performance characteristics which particularly impact on the performance of a given computing system, comprising the steps of, providing data values for the first performance characteristic and the second performance characteristic of the computing system, and applying a mathematical algorithm to derive a correlation value between the first and second characteristics, wherein the correlation value provides and indication of the relative association between the second characteristic and the first characteristic.

In an eighth aspect, the present invention provides a method of analysing a computing system to determine problematic characteristics of the computing system to reduce the number of characteristics which require further analysis, comprising the steps of, providing data values for the first performance characteristic and the second performance characteristic of the computing system, and applying a mathematical algorithm to derive a correlation value between the first and second characteristics, wherein the correlation value provides and indication of the relative association between the second characteristic and the first characteristic.

DETAILED DESCRIPTION OF THE DRAWINGS

Features of the present invention will be presented in the description of an embodiment thereof, by way of example, with reference to the accompanying drawings, in which:

FIG. 1 illustrates a general purpose computing system which may be used to implement the present invention.

DESCRIPTION OF THE PREFERRED EMBODIMENT

At FIG. 1 there is shown a schematic diagram of a computing system 10 suitable for use with an embodiment of the present invention. The computing system 10 may be used to execute applications and/or system services such as deployment services in accordance with an embodiment of the present invention. The computing system 10 preferably comprises a processor 12, read-only memory (ROM) 14, random access memory (RAM) 16, and input/output devices such as disk drives 18, keyboard 22, mouse 24, display 26, printer 28, and communications link 20. The computer includes programs that may be stored in RAM 16, ROM 14, or disk drives 18 and may be executed by the processor 12. The communications link 20 connects to a computer network but could be connected to a telephone line, an antenna, a gateway or any other type of communications link. Disk drives 18 may include any suitable storage media, such as, for example, floppy disk drives, hard disk drives, CD ROM drives or magnetic tape drives. The computing system 10 may use a single disk drive 18 or multiple disk drives. The computing system 10 may use any suitable operating systems, such as Windows™ or Unix™.

It will be understood that the computing system described in the preceding paragraphs is illustrative only, and that an embodiment of the present invention may be executed on any suitable computing system, with any suitable hardware and/or software.

In one embodiment, the present invention is implemented as a software module 30 which may reside on the computing system 10, in conjunction with other software modules 32.

An embodiment of the present invention provides a method of displaying, for every system performance characteristic selected for display or analysis, a list of other highly-correlated system characteristics. In one embodiment of a method in accordance with the present invention, the method comprises the steps of:

1. at every sampling time, the values of all characteristics are collected
2. the correlation coefficient (using a Pearson methodology described hereinafter) between each two characteristics is computed
3. when a characteristic is selected by the system administrator (for display/analysis), the selected characteristic and a list of characteristics having the highest correlation coefficient with regard to the selected characteristic are displayed. The correlation coefficient is a numerical indicator (normalised to a value between 0 and 1) which describes the influence two characteristics have on one another. For example, a correlation coefficient of 0.9 indicates that the two characteristics are highly dependent on each other, whereas a correlation coefficient of 0.1 indicates that the two characteristics have little influence on each other.

The aforementioned list of highly correlated characteristics provides the system administrator with a basis for selecting and more closely examining other performance characteristics which may be of interest.

For example, after selecting disk usage of an overloaded disk, an embodiment of the present invention can display other characteristics with high correlation coefficients. If one of the characteristics with a high correlation coefficient is, for example, the number of transactions executed (of a defined type), this may suggest that the specific transaction type is overloading the specific disk. This knowledge allows, the system administrator to initiate further analysis into the highly correlated characteristic, and corrective action may be taken.

An embodiment of the present invention provides better insight into the causes of system overload. Such insight may be difficult or impossible to obtain using a standard approach (such as calculating global averages of counter values or laboriously tracing application logic). In the abovementioned example, a computing system could be comprised of tens of disks and the application could have hundreds of transaction types, making any type of "manual" analysis difficult and prone to trial and error.

Use of a Pearson correlation coefficient as a measure of dependency provides a quantitative measure of the dependency level and allows for relatively "cheap" on-line computation of coefficients. That is, an embodiment of the present method may be utilised for on-line display, in addition to off-line analysis, since the calculation of the coefficient is not compatationally intensive.

Furthermore, there is a reduced need to have a comprehensive knowledge of system architecture. Whilst the system administrator requires rudimentary knowledge concerning the computing system, the correlation coefficients may be used as a basis for determining problem areas, thus reducing the number of system areas that need to be analysed to uncover possible influences on the selected (critical) performance characteristics.

Whilst the present invention finds an application in determining which performance characteristics are highly correlated, useful information may also be derived from determining which characteristics are not highly correlated.

For example, a high correlation value of the utilization of one processor with the utilization of another processor is normal on most computer systems. In such a situation, the discovery of a lack of correlation between processors may provide evidence of a problem. Therefore, an embodiment of the present invention may also be utilised to determine performance characteristics where a low correlation is present between two separate performance characteristics.

An embodiment of the present invention will now be described by reference to a simplified example.

In a contemporary computing system, various characteristics and descriptors of the load, usage and behaviour of a computing system are commonly collected. The collection process is generally periodical. That is, the underlying processes in a computing system are sampled at defined time intervals (the interval size is generally selected by the system administrator) and a set of data values are recorded and/or displayed for each time interval. For some systems, or some characteristics, such collection occurs on a continuous basis, through the use of a log file or files.

An example of such a system, is the Windows™ operating system, which contains a subsidiary software application 'perfmon'—this application displays graphs of user-selected system characteristics sampled every second by default. Another example is 'sar' on UNIX™ systems, which also displays data values for various system characteristics.

The common aspect of such monitoring systems is that the data produced can be modelled as a large rectangular array (although such data is rarely displayed in this manner). Each column of the array represents one system characteristic (such as CPU utilization), and each row of the array represents the value of all characteristics at a given time. The table below shows an example of such a view of the data:

TABLE I

Example table of system characteristics

| time | cpuUtil | dsk1Util | interrupts/s | . . . | sysCalls/s |
|---|---|---|---|---|---|
| . . . | . . . | . . . | . . . | . . . | . . . |
| 10:32 | .94 | .35 | 111322 | . . . | 23423 |
| 10:37 | .14 | .54 | 234234 | . . . | 34223 |
| 10:43 | .34 | .34 | 445345 | . . . | 97887 |
| . . . | . . . | . . . | . . . | . . . | . . . |

Table I is merely an example of the type of data values which are collected and should be considered to be illustrative and not definitive of the type of data collected by a computing system. The utilisation variables (e.g. cpuUtil and dsk1Util) are values which are normalised to a value in the range between 0 and 1, 0 indicating that no resources are being used, and 1 indicating that the resource is being fully utilised. In practical situations, the table may contain hundreds or thousands of variables (columns) and thousands to tens of thousands of rows (data samples).

A method in accordance with an embodiment of the present invention computes correlation coefficients between all the columns in the table. The correlation coefficient between any two columns of data x and y is defined as:

$$cor(x, y) = \frac{\sum ((x_i - x_{mean})(y_i - y_{mean}))^2}{\sqrt{\sum (x_i - x_{mean})^2 \times \sum (y_i - y_{mean})^2}}$$

A more detailed description of the meaning and usage of the Pearson correlation formula can be found in many texts on statistics. For example, see Bhattacharyya, G. K., and R. A. Johnson, *Statistical Concepts and Methods*, New York, John Wiley, 1977.

The value cor(x, y) is utilised to indicate a possible relationship between two columns—the further away the value is from zero, the closer the possible dependency between the two variables.

System administrators are able to obtain information on how many, say, interrupts per second a computing system is performing. However, the system administrator does not know why an event occurs. To understand why an event occurs, a system administrator requires good system knowledge, experience, data hunting skills and some luck.

Utilising an embodiment of the present invention, a system administrator can list, for each system characteristic, any other highly correlated system characteristics. This provides the system administrator with further information on the behaviour of a computing system.

An embodiment of the present invention will now be described with reference to three examples from a real, though very small, system—with 132 variables (columns), each variable representing a different system characteristic and 3925 samples (rows) each sample representing the usage of each characteristic during a defined time interval (say, per second).

Firstly the performance characteristic 'interrupts per second' are selected and, applying the Pearson correlation coefficient formula to determine the performance characteristics with highest correlation coefficients, the following list is obtained:

| BASE: "X..ACUS.5085R.Processor..Total..Interrupts.sec" | |
|---|---|
| recentIo | 0.69 |
| X..ACUS.5085R.PhysicalDisk.0.C...Disk.Transfers.sec | 0.69 |
| tot.recentIoPerTx | 0.61 |
| X..ACUS.5085R.PhysicalDisk.0.C.....Disk.Time | 0.59 |
| X..ACUS.5085R.PhysicalDisk..Total....Disk.Time | 0.49 |
| X..ACUS.5085R.PhysicalDisk..Total..Avg..Disk.Bytes.Transfer | −0.25 |
| tot.runTime | −0.20 |

The first line in the list represents a particular characteristic, which has been dubbed the "base" characteristic. In this case, it is the total interrupts per second for a processor. The subsequent lines in the list represent further characteristics and associated correlation coefficients (which have been computed by computing the Pearson correlation coefficient between each of the further characteristics and the base characteristic).

When examining the list, a system administrator may suspect that interrupts are closely related to various occurrences on physical disk 0, as variables related to disk number '0' are highly correlated with the number of interrupts.

In a second example, the system administrator may be interested in CPU time. Utilising an embodiment of the present invention, the following list of highly correlated performance characteristics is generated.

| BASE: "recentCpu" | |
|---|---|
| X..ACUS.5085R.Processor..Total....Privileged.Time | 0.86 |
| pro.sqlservr | 0.51 |
| X..ACUS.5085R.System.System.Calls.sec | 0.42 |
| pro.System | 0.42 |
| tot.tot.rt | −0.19 |
| tot.recentCpuPerTx | 0.18 |
| prc.java | 0.14 |

From the generated list, it is apparent that high CPU usage is related to use of privileged time and the SQL server process.

In a third example, a system administrator may be interested in an SQL server process. A generated list of the processes which are highly correlated to the SQL server process produces the following list:

| BASE: "prc.sqlservr" | |
|---|---|
| tot.recentTx | 0.64 |
| cCI | 0.63 |
| tot.tot.rt | −0.61 |

In this example, the SQL server process usage is closely related to transactions in general (as is expected) but the CI transaction in particular (which may be unexpected). Furthermore, the high usage of the SQL server process occurs at a time when the response time is low.

Therefore, provided with this information, the system administrator can investigate the CI transaction to determine whether it should be modified and/or re-written to improve performance.

These three examples illustrate the advantages of an embodiment of the present invention. An embodiment of the present invention provides significant insight into the dependencies between various system characteristics.

Modifications and variations as would be apparent to a skilled addressee are deemed to be within the scope of the present invention.

The invention claimed is:

1. A method of determining the probable cause of sub-optimal performance in a computing system, comprising the steps of:
    (a) determining a dependency between a first and a second system resource performance characteristic in a computing system, wherein the step of determining a dependency includes the steps of:
        (a1) applying a mathematical algorithm to data values for said first performance characteristic and said second performance characteristic of the computing system to derive said correlation value between said first and second characteristics;
        (a2) providing said correlation value as an indication of the relative dependency between said second characteristic and said first characteristic;
        (a3) setting said correlation value between "0" and "1" wherein the higher values between 0 and 1 indicate that said first and second performance characteristic are highly dependent on one another while the lower values indicate that said first and second performance characteristics have lesser influence on one another.

2. A system for analyzing a computing system comprising determination means arranged to determine a dependency between a first and a second system resource performance characteristic in a computing system, the determination means further comprising:
    (a) data gathering means arranged to provide data values for said first performance characteristic and said second performance characteristic of the computing system;
    (b) computational means arranged to apply a mathematical algorithm to derive a correlation value between said first and second characteristics; and
    (c) providing said correlation value to indicate the relative dependency between said second characteristic and said first characteristic, where higher numerical values of said correlation value indicate a greater dependency between said first and second characteristics.

3. A method of analyzing a computing system to determine problematic characteristics of the computing system so as to reduce the number of characteristics which require further analysis, comprising the steps of:
  (a) providing data values for a first performance characteristic and for a second performance characteristic of said computing system; and
  (b) applying a mathematical algorithm to derive a correlation value between said first and second performance characteristics, wherein said correlation value provides a numerical indication of the relative dependency between the second characteristic and the first characteristic said relative dependency increasing according to the higher value of said numerical indication.

* * * * *